Dec. 6, 1966

E. GSCHWANDTNER 3,290,608

CIRCUIT FOR COUPLING A TRANSISTOR TO AN ANGULAR MODULATION DETECTOR

Filed April 22, 1964

INVENTOR.

ERICH GSCHWANDTNER

BY

Frank R. Jerifari

AGENT 3,290,608
Patented Dec. 6, 1966

3,290,608

CIRCUIT FOR COUPLING A TRANSISTOR TO AN ANGULAR MODULATION DETECTOR

Erich Gschwandtner, Rexdale, Ontario, Canada, assignor to North American Philips Company, Inc., New York, N.Y., a corporation of Delaware Filed Apr. 22, 1964, Ser. No. 361,843
Claims priority, application Canada, Apr. 23, 1963, 873,846
4 Claims. (Cl. 329—103)

This invention relates to a circuit arrangement for angle modulation detection of an alternating current signal, comprising a transformer having resonant primary and secondary circuits tuned to a common centre frequency and a tertiary winding coupled tightly with said primary winding, means connecting one end of said tertiary winding to a point of reference potential and the other end to a centre tap of the winding of the secondary circuit, diode load means connected to said secondary circuit to produce a voltage output representative of any angle modulation about the centre frequency of said tuned circuits of said alternating current signal.

In utilizing transistors in frequency or phase modulation receivers, utilizing angle modulation detectors of the ratio- and discriminator types, the problem of matching the high impedance tuned circuits to the low input and output impedances of a transistor has to be overcome. This is usually accomplished by tapping down on the inductive winding of one of the tuned circuits. Due to this transformers have to be specially manufactured for the purpose.

It is, therefore, an object of the invention to provide a novel method of driving a ratio or discriminator-type transformer with a transistor amplifier which inherently does not require more than minor modifications of the transformers as used in vacuum tube practice.

Therefore the invention is characterized in that the alternating current signal is supplied by a transistor having its collector electrode connected to said other end of the tertiary winding. Thus, the tertiary winding, i.e., the winding tightly coupled to the primary tuned circuit of the transformer and feeding a voltage in phase with the primary winding to the centre tap of the secondary winding, is utilized as the output load of the driver transistor and the usual primary winding is energized thereby and carries no direct current.

It has been found that the impedance presented by the tertiary winding is substantially correct for loading of the driver transistor.

Figure 1:
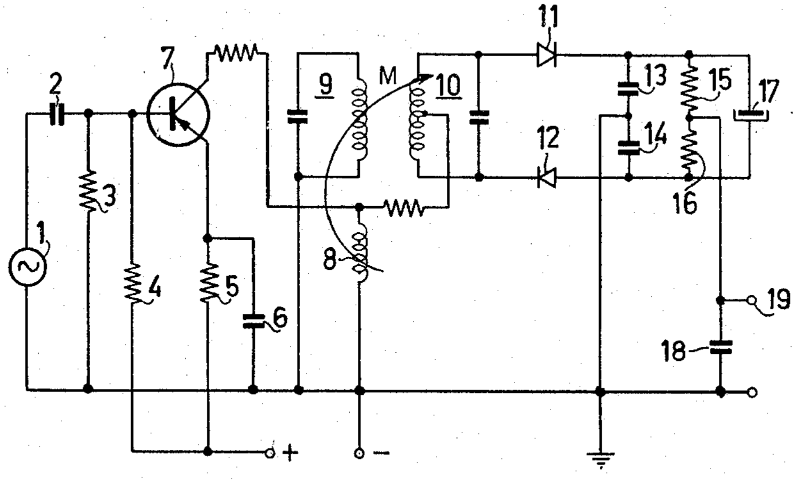
Figure 2:
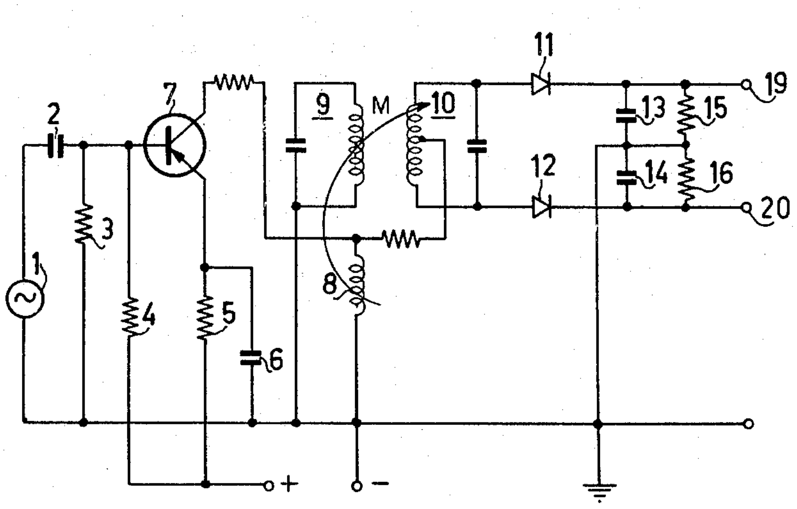

The manner in which the invention is carried into practice will now be described with reference to the figures of the drawing in which, FIGURE 1 shows the application of the invention to a ratio-type detector and, FIGURE 2 shows its application to a discriminator-type detector.

Referring to FIGURE 1, a source of angle modulated radio frequency signals 1 are supplied to the base-emitter circuit of a transistor amplifier circuit incorporating transistor 7. A resistive network 3, 4, provides a small forward bias to the base electrode of transistor 7. A positive voltage, with respect to ground is applied to the emitter electrode through a resistor 5. The emitter is decoupled for radio frequency by a capacitor 6.

The collector of transistor 7 is connected to ground through the tertiary winding 8 of the ratio detector transformers 8, 9, 10. Winding 8 is tightly coupled to the primary winding and oscillatory voltages induced therein are substantially in phase. The tertiary winding, as is well-known, supplies a voltage in phase with the voltage of primary 9, to the centre tap of secondary circuit 10.

An oscillatory voltage, phase displaced by 90° with respect to the voltage on circuit 9, is produced across circuit 10 by the mutual inductive coupling between circuits 9 and 10 when the oscillatory voltage is at the resonant frequency of these two circuits.

The remainder of the circuitry is completely conventional, the audio voltage output of the detector being available between terminal 19 and ground. Thus, diodes 11 and 12 are connected to the ends of the secondary circuit with opposite polarity, the remaining terminals of the diodes being connected to ground by way of capacitors 13 and 14 respectively. The rectified sum of the voltages across winding 8 and the upper part of circuit 10 thus appears across capacitor 13 and the rectified sum of the voltages across winding 8 and the lower part of circuit 10 appear across capacitor 14. Stabilizing capacitor 17 maintains the total voltage across capacitors 13 and 14 substantially constant, so that the detected voltage is developed between the junction of capacitors 13 and 14 and the junction of resistors 15 and 16 connected in parallel with a capacitor 17. Capacitor 18 connected between ground and the junction of resistors 15 and 16 is an intermediate frequency by-pass capacitor. The output terminal 19 is connected to the junction of resistors 15 and 16.

In the circuit just described, the low impedance of the tertiary winding was suitable for loading of transistor 7. It was found that with this circuit and appropriate coupling a detector bandwidth of 1 megacycle could be obtained at a centre frequency of 10.7 megacycles.

FIGURE 2 shows the modifications necessary for the use of the invention with a discriminator-type transformer. Diodes 11 and 12 are now uniformly poled and a direct current connection is made between the junction of capacitors 13 and 14, the junction of resistors 15, 16 and ground. The audio output voltage is available between output terminal 19 or 20 and ground.

What is claimed is:

1. A circuit for the demodulation of angular modulated signals, comprising first and second resonant circuits tuned to a common center frequency, said first and second resonant circuits comprising inductively coupled primary and secondary windings respectively, said secondary winding having a center tap, a tertiary winding tightly inductively coupled to said primary winding, means connecting one end of said tertiary winding to said tap and the other end thereof to a point of reference potential, a source of angular modulated signals, a transistor having a collector electrode, means connecting said collector to said one end of said tertiary winding whereby said signals are coupled to said primary winding only by the inductive coupling between said primary and teritary windings, and diode load means connected to said second resonant circuit for producing an output voltage representative of angular modulation of said signals about said center frequency.

2. The circuit of claim 1 connected as a ratio detector, wherein said diode load means comprises first diode means having its anode connected to one end of said secondary winding, second diode means having its cathode connected to the other end of said secondary winding, first capacitor means connected between said point and the cathode of said first diode means, second capacitor means connected between said point and the anode of said second diode means, resistor means connected between the cathode of said first diode means and the anode of said second diode means, stabilizing capacitor means connected in parallel with said resistor means, and output terminal means connected to a tap on said resistor means.

3. The circuit of claim 1 connected as a frequency discriminator, wherein said diode load means comprises first and second diode means having like electrodes connected to opposite sides of said secondary winding, first parallel resistance-capacitance circuit means connected between said point and the other electrode of said first diode means, second parallel resistance-capacitance circuit means connected between said point and the other electrode of said second diode means, and output terminals connected to the other electrodes of said first and second diode means.

4. A circuit for the demodulation of angular modulated signals, comprising first and second resonant circuits tuned to a common center frequency, said first and second resonant circuits comprising inductively coupled primary and secondary windings respectively, said secondary winding having a center tap, a tertiary winding tightly inductively coupled to said primary winding, means connecting one end of said tertiary winding to said tap and the other end thereof to a point of reference potential, a source of angular modulated signals, a transistor having input, common and collector electrodes, a source of operating voltage having a first terminal connected to said point and a second terminal, bias impedance means for connecting said second terminal to said input and common electrodes, means applying said signals between said input and common electrodes, means for connecting said collector electrode to said one end of said tertiary winding whereby the collector current of said transistor flows through said tertiary winding and said signals are coupled to said primary winding only by way of the inductive coupling between said primary and tertiary windings, and diode load means connected to said second resonant circuit for producing an output voltage representative of angular modulations of said signals about said center frequency.

References Cited by the Examiner

UNITED STATES PATENTS

| | | | |
|---|---|---|---|
| 2,956,159 | 10/1960 | Ebbinge | 329—101 X |
| 3,092,779 | 6/1963 | De Niet. | |
| 3,164,779 | 6/1965 | Pleasure | 307—88.5 |

ROY LAKE, *Primary Examiner.*

A. L. BRODY, *Assistant Examiner.*